United States Patent [19]

Ban et al.

[11] 4,220,233

[45] Sep. 2, 1980

[54] CLUTCH ASSEMBLY FOR USE WITH AN INTERNAL COMBUSTION ENGINE

[75] Inventors: Hiroshi Ban, Toyota; Hideichi Hori, Tokai; Ryoichi Kudo; Akio Yoshida, both of Toyota, all of Japan

[73] Assignees: Aisin Seiki Kabushiki Kaisha, Kariya; Toyota Jidosha Kogyo Kabushiki Kaisha, Toyota, both of Japan

[21] Appl. No.: 916,113

[22] Filed: Jun. 16, 1978

[30] Foreign Application Priority Data

Jun. 16, 1977 [JP] Japan .................................. 52/71450

[51] Int. Cl.² ............................................... F16D 3/14
[52] U.S. Cl. .................. 192/106.2; 64/27 C; 74/572
[58] Field of Search ............... 192/55, 106.2; 74/572; 64/15 C, 27 C

[56] References Cited

U.S. PATENT DOCUMENTS

| | | | |
|---|---|---|---|
| 3,983,982 | 10/1976 | Wörner | 64/27 C |
| 4,002,043 | 1/1977 | Yushida | 64/27 C |
| 4,018,320 | 4/1977 | Schrape et al. | 64/27 C |
| 4,101,015 | 7/1978 | Radke | 64/27 C |

FOREIGN PATENT DOCUMENTS

| | | |
|---|---|---|
| 320066 | 10/1929 | United Kingdom . |
| 1030851 | 5/1966 | United Kingdom . |
| 1230284 | 4/1971 | United Kingdom . |

*Primary Examiner*—Louis Rimrodt
*Attorney, Agent, or Firm*—Finnegan, Henderson, Farabow, Garrett & Dunner

[57] ABSTRACT

A clutch assembly for use with a vehicle's internal combustion engine, including a driving flywheel connected to an engine output, a driven flywheel rotatably mounted on the driving flywheel through a flanged bush, coil springs provided between the driving flywheel and the driven flywheel for imparting the rotational torque therebetween, and damping elements provided therebetween for absorbing vibration due to the fluctuating torque produced by the engine. The damping elements comprise a thrust washer, a friction plate and a dish spring which normally urges the driven flywheel toward the driving flywheel.

5 Claims, 2 Drawing Figures

CLUTCH ASSEMBLY FOR USE WITH AN INTERNAL COMBUSTION ENGINE

BACKGROUND OF THE INVENTION

This invention generally relates to a clutch assembly for use with an internal combustion engine and more particularly to a clutch assembly wherein an apparatus is provided for reducing any vibration of a vehicle's internal combustion engine.

The fluctuating torque present in the output torque of the engine causes various problems of vibration and noise, as is well known. In order to resolve such problems there have been taken lots of measures in the field of this art. As far as the applicants of the present invention are aware, the most effective way for reducing the vibrations has been disclosed in U.S. Pat. No. 4,002,043 granted to A. Yoshida on Jan. 11, 1977 wherein flywheel means of a clutch assembly is divided into two elements, i.e., a driving flywheel and a driven flywheel, and a damped oscillation means is provided between these elements. However, according to the construction of the above U.S. patent, it is difficult to keep the coaxial and parallel relationship between the driving flywheel and the driven flywheel for a long time, and to apply a stable friction torque therebetween.

SUMMARY OF THE INVENTION

Therefore, a main object of the present invention is to provide a clutch assembly wherein any vibration or engine noise may be effectively eliminated.

Another object of the present invention is to provide a clutch assembly which includes separate flywheels and a damped oscillating, means provided therebetween in a more practical way.

A further object of the present invention is to provide a clutch assembly which is simple in construction and inexpensive to manufacture.

The other objects or features of the invention will become apparent from the following description taken in connection with the accompanying drawings.

DETAILED DESCRIPTION OF THE INVENTION

Figure 1:
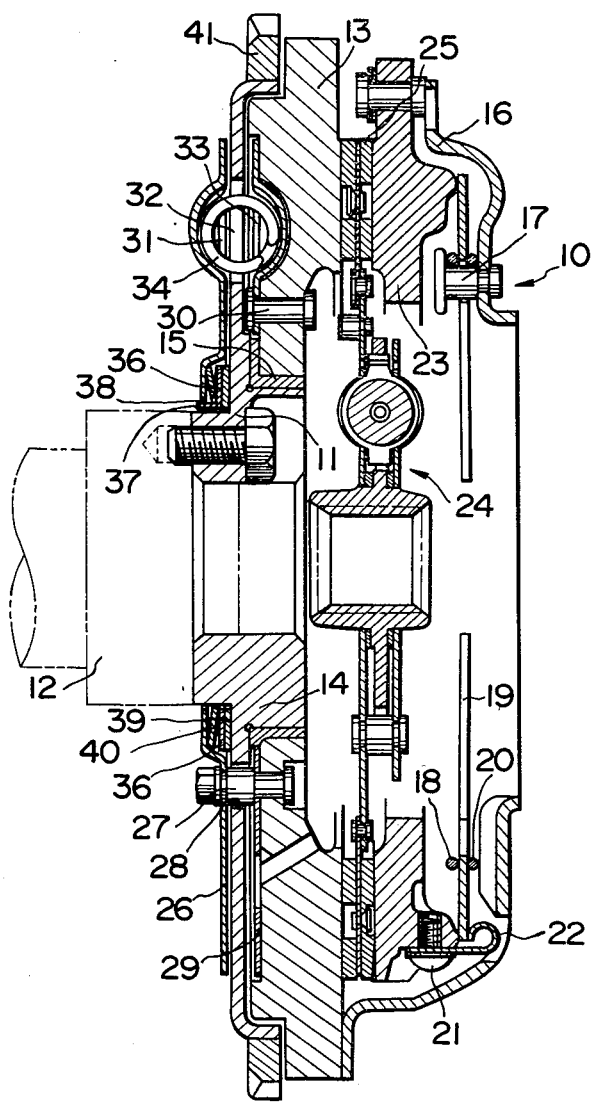
FIG. 1 is a staggered longitudinal section of one embodiment of a clutch assembly in accordance with the present invention.

Referring now to the drawings, especially FIG. 1 thereof, a clutch assembly generally designated by the reference numeral 10 comprises a driving flywheel 11 connected to an output shaft 12 of an internal combustion engine (not shown) and a driven flywheel 13 rotatably mounted on a projecting boss 14 of the driving flywheel 11 through a flanged bush 15 which is pressed into the driven flywheel 13 and is durable and lubricated.

A clutch cover 16 is secured to the driven flywheel 13 by a suitable connection and carries pivot ring retaining studs 17 which are arranged in a circle about the clutch axis. A pivot ring 18 is held between the heads of the studs 17 and a diaphragm spring 19 and an identical pivot ring 20 is held between the diaphragm spring 19 and the cover 16. Rivets 21 secure retracting springs 22 to a pressure plate 23 which is connected to the clutch cover 16 for unitary rotation therewith.

A clutch disc assembly 24 is axially slidably mounted on an output shaft (not shown) which is properly journalled in the engine output shaft 12 and passes a central aperture of the diaphragm spring 19. The outer portion of the clutch disc assembly 24 is provided with friction material 25 arranged to be clamped between the driven flywheel 13 and the pressure plate 23 upon engagement of the clutch.

Figure 2:
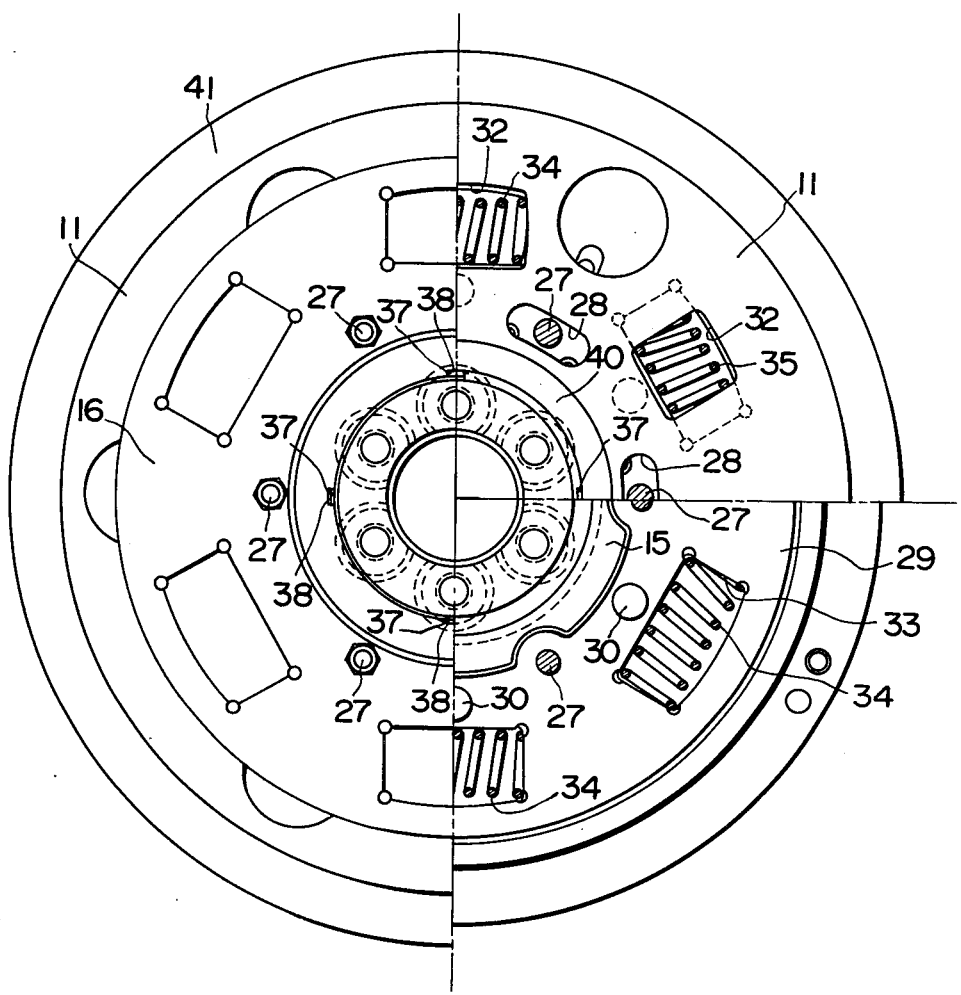
FIG. 2 is an elevational view of the clutch assembly of FIG. 1 with parts removed for clarity along the chaindotted lines.

A cover plate 26 interposed between the engine and the driving flywheel 11 is fixed to the driven flywheel 13 by means of pins 27 which pass holes 28 provided on the driving flywheel 11. An auxiliary plate 29 interposed between both flywheels 11 and 13 is also fixed to the driven flywheel 13 by the pins 27 and rivets 30. Each hole 28 is roughly rectangular in shape, as seen in FIG. 2, thereby permitting the relative rotation of the flywheels 11 and 13 to each other. The cover plate 26 is provided with six recesses 31. The driving flywheel 11 and the auxiliary plate 29 are similarly provided with six recesses 32 and 33 respectively, all of the recesses 31 to 33 being in alignment with each other. All of the recesses 31 and 33 are formed in the identical shape and size, but only four of six recesses 32 on the driving flywheel 11 are formed in the same shape and size as the recesses 31 and 33 so as to receive coil springs 34 therewithin while the remaining two recesses 32 on the driving flywheel 11 are formed smaller in circumferental length than the recesses 31 and 33 so as to receive coil springs 35 therewithin. The coil springs 34 normally serve to transmit the rotational torque while the coil springs 35 serve to transmit the rotational torque only when the torque is large. A thrust washer 36, having axial fingers 37 adapted for fitting with circumferentially spaced notches 38 of the inner periphery of the cover plate 26, is provided between the cover plate 26 and the driving flywheel 11. Between the thrust washer 37 and the driving flywheel 11 is interposed an annular friction plate 39 while between the thrust washer 37 and the cover plate 26 is interposed a dish spring 40, so that the frictional torque may be applied between two flywheels 11 and 13.

The numeral 41 is a ring gear secured to the outer periphery of the driving flywheel 11 for initiating the movement of the internal combustion engine.

The operation of the clutch assembly 10 will be briefly explained below. Upon the clutch disengagement, the inner edges of the diaphragm spring 19 are pressed by a release bearing (not shown). Thus the outer periphery of the diaphragm spring 19 is moved to the right by the rotation of the diaphragm spring about the pivot rings 18 and 20, so that the pressure plate 23 is also moved to the right by the retracting springs 22 to disengage the clutch disc assembly 24. When the clutch is re-engaged the diaphragm spring 19 is returned to its original position shown in FIG. 1 by its own elasticity.

Any rotational vibrations of the internal combustion engine will be absorbed by the damped oscillation system comprising the driving flywheel 11, the driven flywheel 13, the coil springs 34 (or the coil springs 34 and the coil springs 35), and the friction plate 39 which is in frictional engagement with the thrust washer 36 or the driving flywheel 11.

It will be seen that the driving flywheel 11 and the driven flywheel 13 are normally coaxially held since the driven flywheel 13 is mounted on the driving flywheel 11 through means of the flanged bush 15 and urged toward the driving flywheel 11 by means of the dish spring 40. In addition, the stable frictional torque will be applied on each flywheel by means of provision of the thrust washer 36, the friction plate 39 and the dish spring 40 between the cover plate 26 and the driving flywheel 11. It is also to be noted that the coil springs 34 and 35 will be firmly held in the recesses 31, 32 and 33 of the cover plate 26, the driving flywheel 11 and the auxiliary plate 29 respectively.

As will be apparent to those skilled in the arts, the coil springs 34 and 35 may be replaced by the rubber to transmit the torque. Another modification will show the coil springs 35 may serve normally to transmit the torque. Additionally, the trust washer 36 may be engaged with the driving flywheel 11 in place of the cover plate 26, and the friction plate 39 may be interposed between the thrust washer 36 and the cover plate 26 while the dish spring 40 may be interposed between the thrust washer 36 and the driving flywheel 11.

Obviously, many modifications and variations of the present invention are possible in light of the above. It is, therefore, to be understood that within the scope of the appended claims, the invention may be practicable otherwise than as specifically described herein.

What is claimed is:

1. A flywheel assembly for use with an internal combustion engine comprising,
    a driving flywheel drivingly connected to said internal combustion engine and provided with recess means, said driving flywheel having a boss portion;
    a flanged bush fitted on said boss portion of said driving flywheel;
    a driven flywheel rotatably mounted on, and co-axially positioned by, said flanged bush;
    a first plate confronting one side of said driving flywheel at the side of said engine;
    a second plate confronting the other side of said driving flywheel and interposed between said driving flywheel and said driven flywheel;
    each of said plates being fixed to said driven flywheel and provided with recess means in alignment with said recess means of said driving flywheel;
    resilient means disposed in said recess means of said driving flywheel and said first and second plates, thereby imparting a rotational torque from said driving flywheel to said driven flywheel; and
    damping elements provided between said first plate and said driving flywheel and having a thrust washer, a friction plate and a dish spring, thereby absorbing virbration due to the fluctuating torque produced by said engine.

2. The flywheel assembly of claim 1 wherein said thrust washer is engaged with said first plate, said friction plate is interposed between said thrust washer and said driving flywheel, and said dish spring is interposed between said thrust washer and said first plate.

3. The flywheel assembly of claim 1 wherein said thrust washer is engaged with said driving flywheel, said friction plate is interposed between said thrust washer and said first plate, and a dish spring is interposed between said thrust washer and said driving flywheel.

4. The flywheel assembly of claim 1 wherein at least one of said recess means of said driving flywheel is smaller in size than said recess means of eah of said plates, while the other recess means of said driving flywheel are substantially identical in size with said recess means of each of said plates.

5. The flywheel assembly of claim 1 wherein said driving flywheel is provided with holes for loosely inserting pins, respectively, which secure said plates to said driven flywheel.

* * * * *